United States Patent [19]
Chen

[11] Patent Number: 5,996,641
[45] Date of Patent: Dec. 7, 1999

[54] OUTER TUBE STRUCTURE FOR FLEXIBLE TUBES

[76] Inventor: Te-Sen Chen, No. 101, Lane 512 Sec. 2, Jang-Nan Rd., Jang-Hua City, Taiwan

[21] Appl. No.: 09/076,853

[22] Filed: May 13, 1998

[51] Int. Cl.[6] .................................................. F16L 11/115
[52] U.S. Cl. ......................... 138/122; 138/125; 138/129; 138/173
[58] Field of Search ................................. 138/122, 125, 138/126, 127, 129, 133, 136, 173

[56] References Cited

U.S. PATENT DOCUMENTS

| | | | |
|---|---|---|---|
| 2,688,343 | 9/1954 | Cuddeback | 138/133 |
| 4,098,298 | 7/1978 | Vohrer | 138/122 |
| 4,620,569 | 11/1986 | Von Glanstatten et al. | 138/129 |
| 4,961,977 | 10/1990 | Archer et al. | 138/125 |
| 5,555,915 | 9/1996 | Kanao | 138/122 |

*Primary Examiner*—James F. Hook
*Attorney, Agent, or Firm*—Rosenberg, Klein & Bilker

[57] ABSTRACT

A flexible tube includes an inner tube and an outer tube structure mounted around the inner tube. The outer tube structure includes an outer protective tube wound around the inner tube and including a helical channel defined therein. An elastomeric tubular member is securely mounted in and extended along the helical channel. A rigid strip member is securely received in and extended along a length of the elastomeric tubular member. A number of elastomeric strings received in and extended along the length of the elastomeric tubular member.

1 Claim, 8 Drawing Sheets

OUTER TUBE STRUCTURE FOR FLEXIBLE TUBES

BACKGROUND OF THE INVENTION

1. Field of the Invention

The present invention relates to an improved outer tube structure for flexible tubes.

2. Description of the Related Art

FIGS. 5 and 6 of the drawings illustrate a prior art flexible tube in which an inner tube 30 is wound around by a protective tube 31. Between the inner tube 30 and the outer tube 31, a metallic strip 32 and a string 33 are helically wound to reinforce the structure. However, as shown in FIG. 6, a considerable gap exists between the strip 32 and the string 33 such that the flexible tube is deformed and bent and thus blocked when subjected to an external force. As a result, fluid or gas, which is delivered by the flexible tube, cannot pass. In addition, the bent area of the flexible tube cannot return to its original shape after the external force has been removed. Further, the metallic strip 32 may pierce the inner tube, which is usually made of rubber.

FIG. 7 illustrates another prior art flexible tube which includes a metallic outer strip 41 wound around a rubber inner tube 40. The outer strip 41 includes complimentarily shaped protrusion and recess defined in an outer side and an inner side thereof, respectively. Nevertheless, when the flexible tube is subjected to a relatively large load or is bent by a relatively large angle, the metallic outer strip 41 will be deformed and thus cause irrecoverable damage to the inner tube 40. Further, the rubber inner tube 40 also tends to be pierced by the metallic strip 41.

FIG. 8 illustrates a further prior art flexible tube which includes an inner rubber tube 50 covered by a steel net 51, which is time-consuming and costly. In addition, the bend-resistant effect and the shape recovery capability are found unsatisfactory.

The present invention is intended to provide an improved outer tube structure which mitigates and/or obviates the above-mentioned problems.

SUMMARY OF THE INVENTION

It is a primary object of the present invention to provide an improved flexible tube which includes a reinforced outer tube structure.

The present invention provides a flexible tube which comprises an inner tube and an outer tube structure mounted around the inner tube. The outer tube structure comprises an outer protective tube wound around the inner tube and including a helical channel defined therein. An elastomeric tubular member is securely mounted in and extended along the helical channel. A rigid strip member is securely received in and extended along a length of the elastomeric tubular member. A plurality of elastomeric strings received in and extended along the length of the elastomeric tubular member.

The flexible tube so constructed has increased resistance to deformation of the inner tube, better shape-recovery capability, and damage prevention to the inner tube.

Other objects, advantages, and novel features of the invention will become more apparent from the following detailed description when taken in conjunction with the accompanying drawings.

DESCRIPTION OF THE EMBODIMENT

Figure 1:
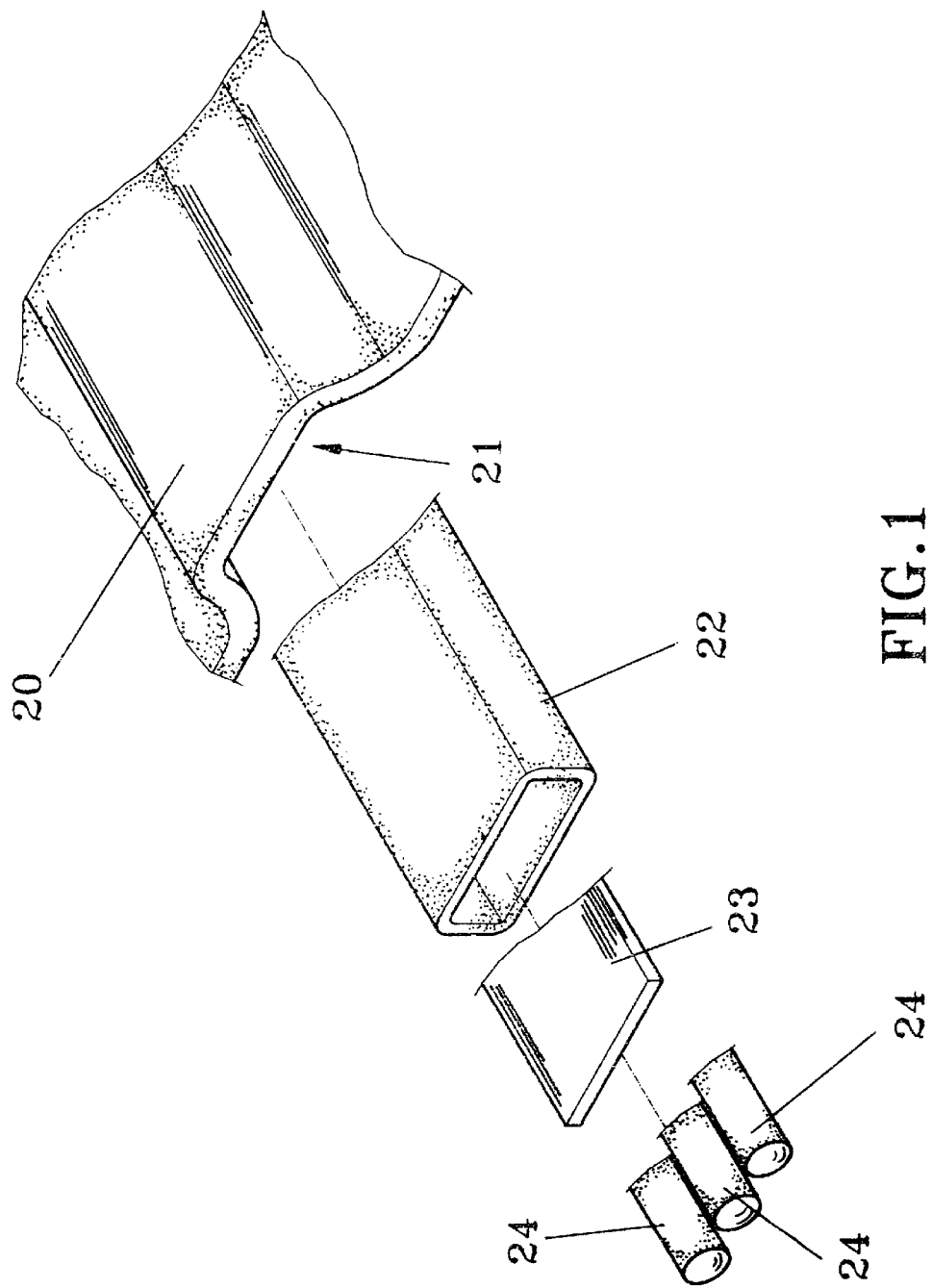
FIG. 1 is an exploded perspective view of an outer tube structure for flexible tubes in accordance with the present invention.
Figure 2:
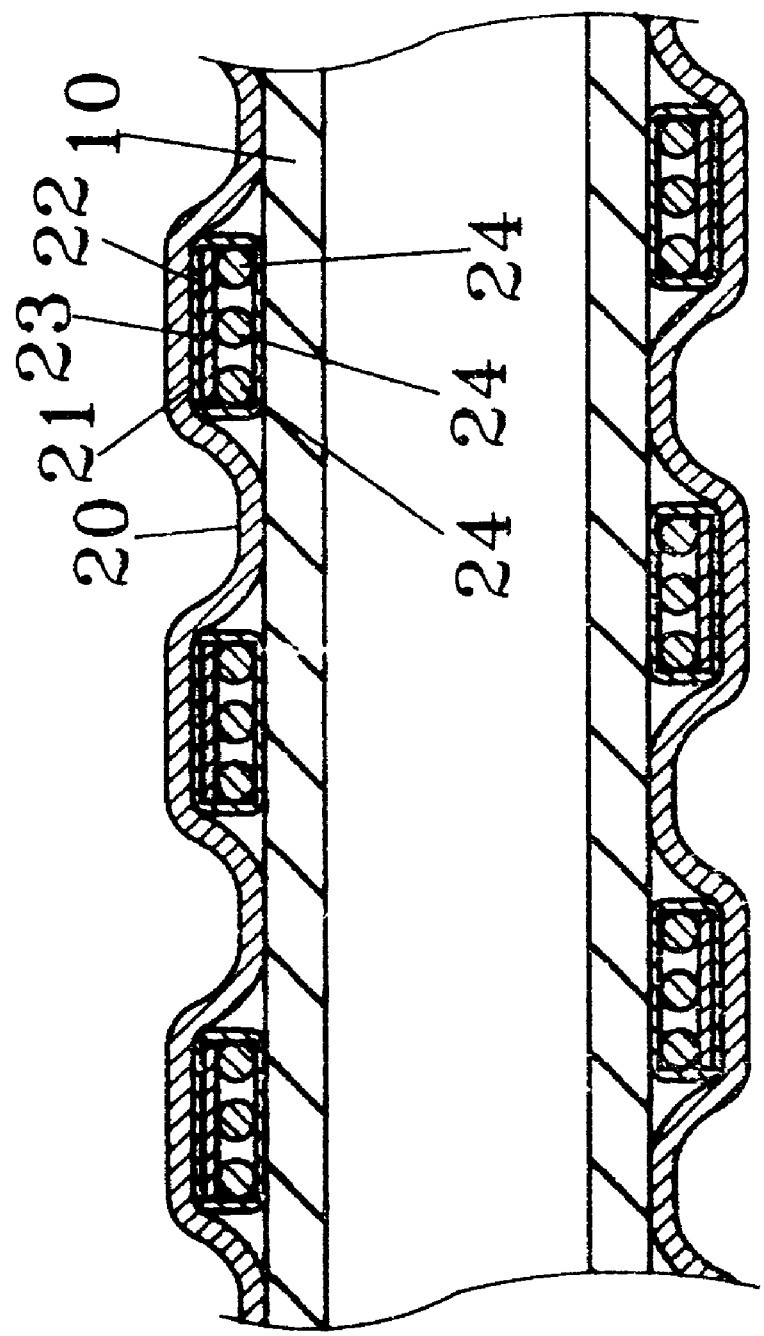
FIG. 2 is a longitudinally sectional view of a flexible tube in accordance with the present invention.
Figure 3:
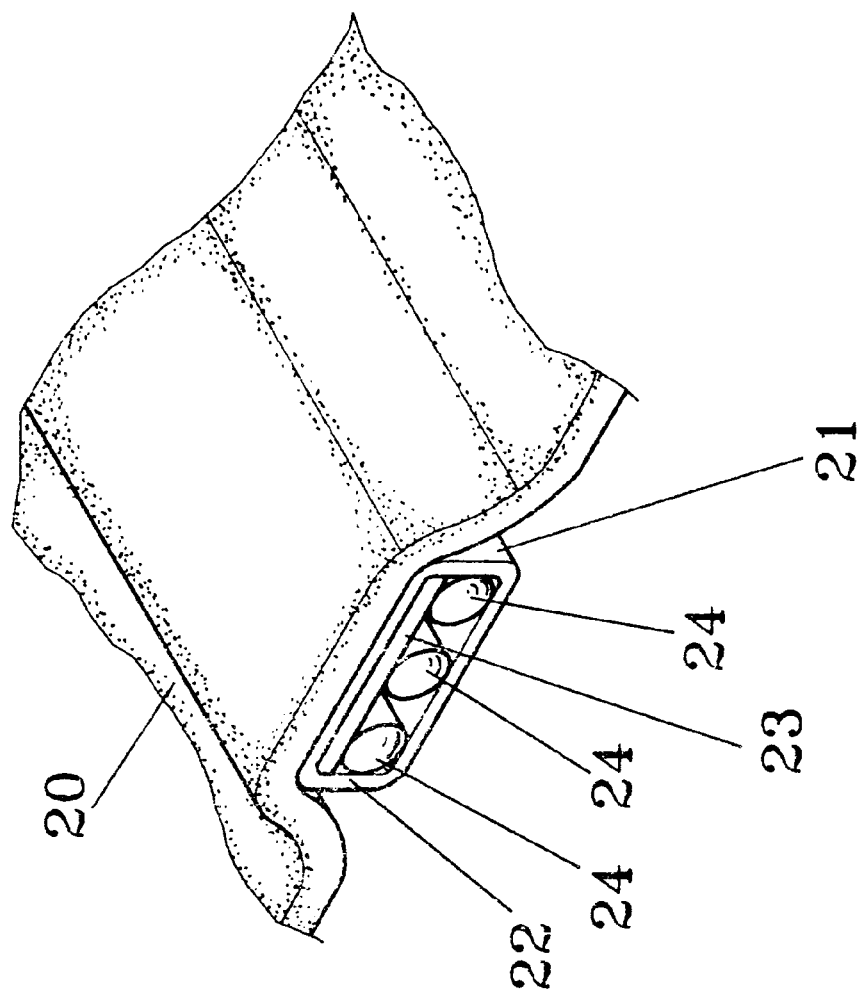
FIG. 3 is a perspective view of a section of the outer tube structure.
Figure 4:
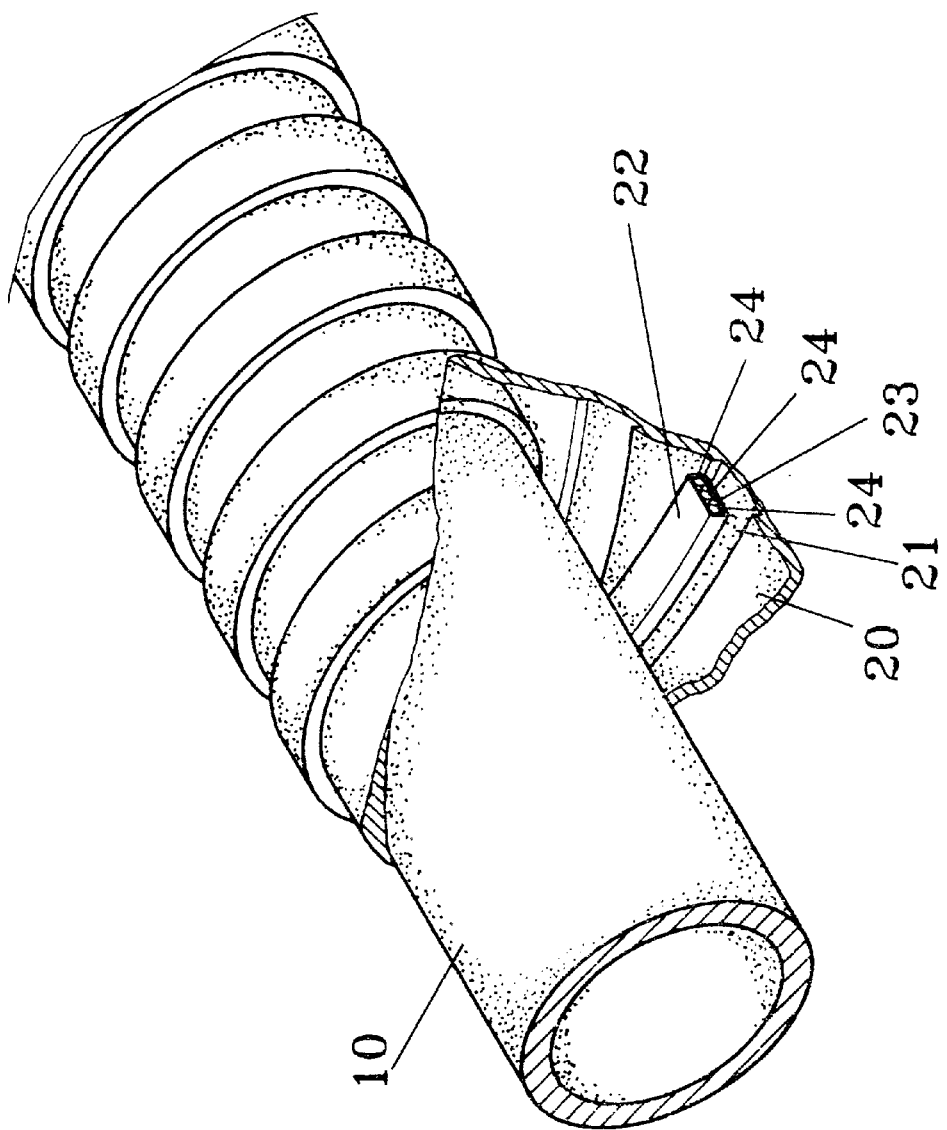
FIG. 4 is a perspective view of the flexible tube in accordance with the present invention.
Figure 5:
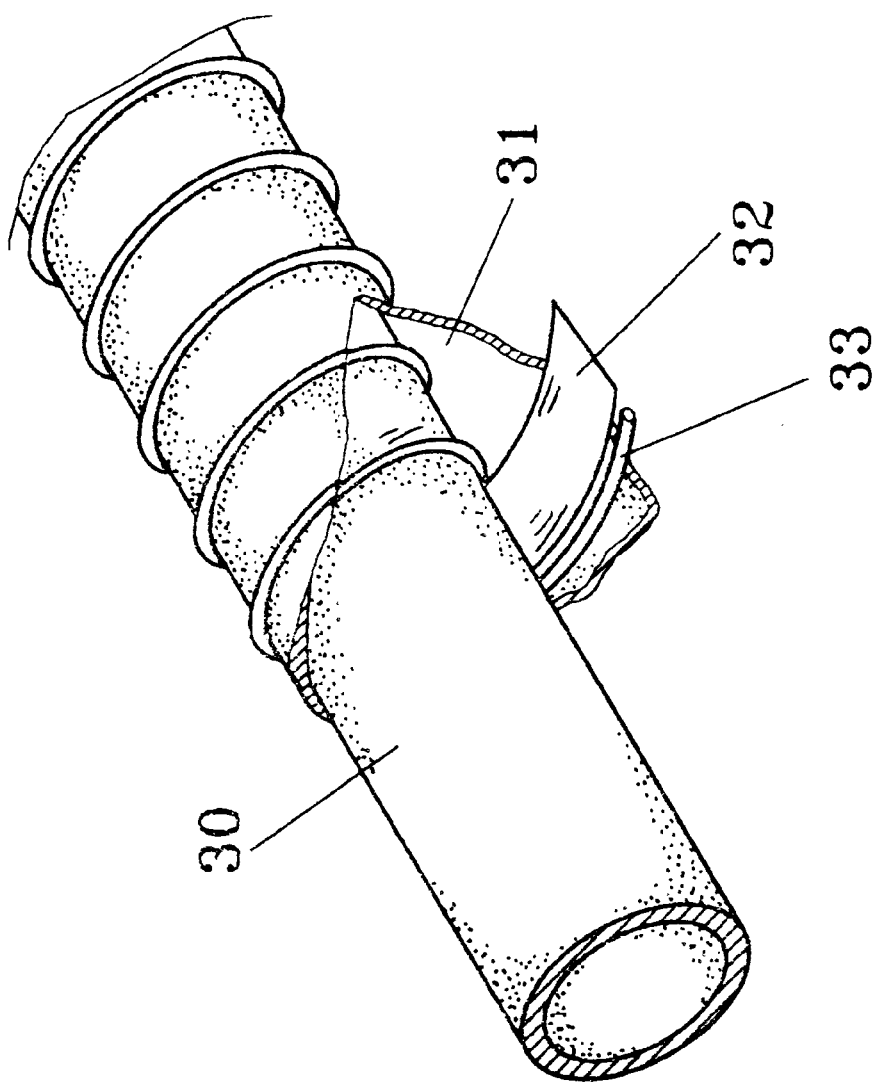
FIG. 5 is a perspective view of a prior art flexible tube.
Figure 6:
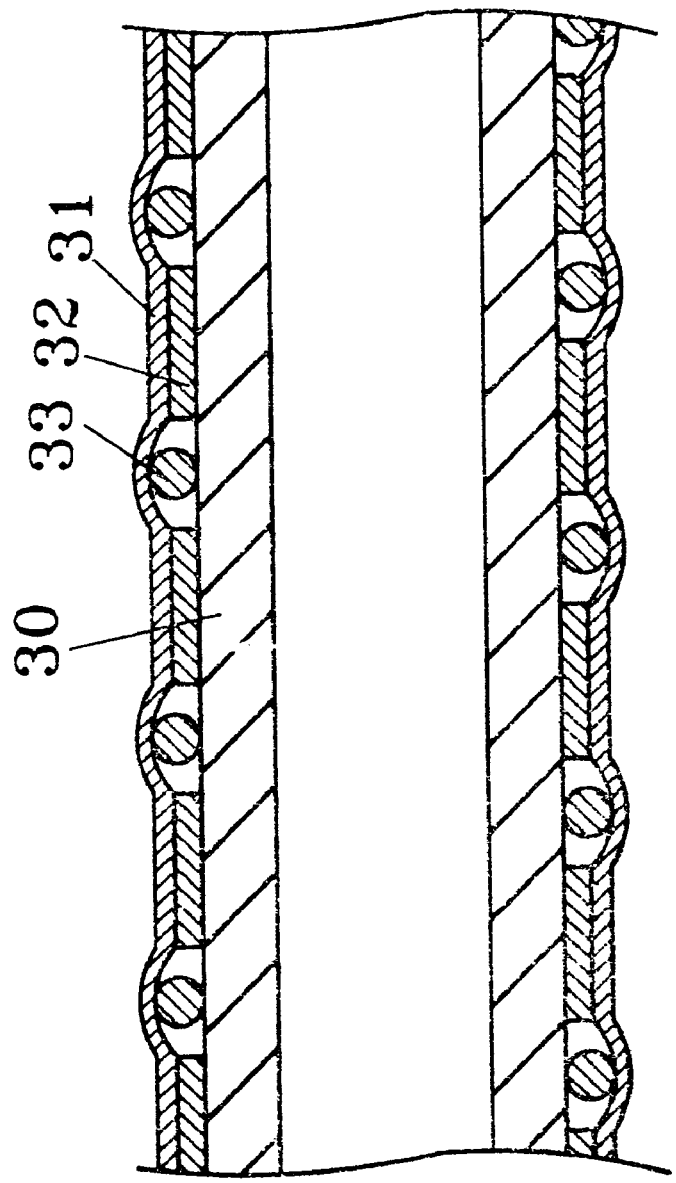
FIG. 6 is a sectional view of the prior art flexible tube in FIG. 5.
Figure 7:
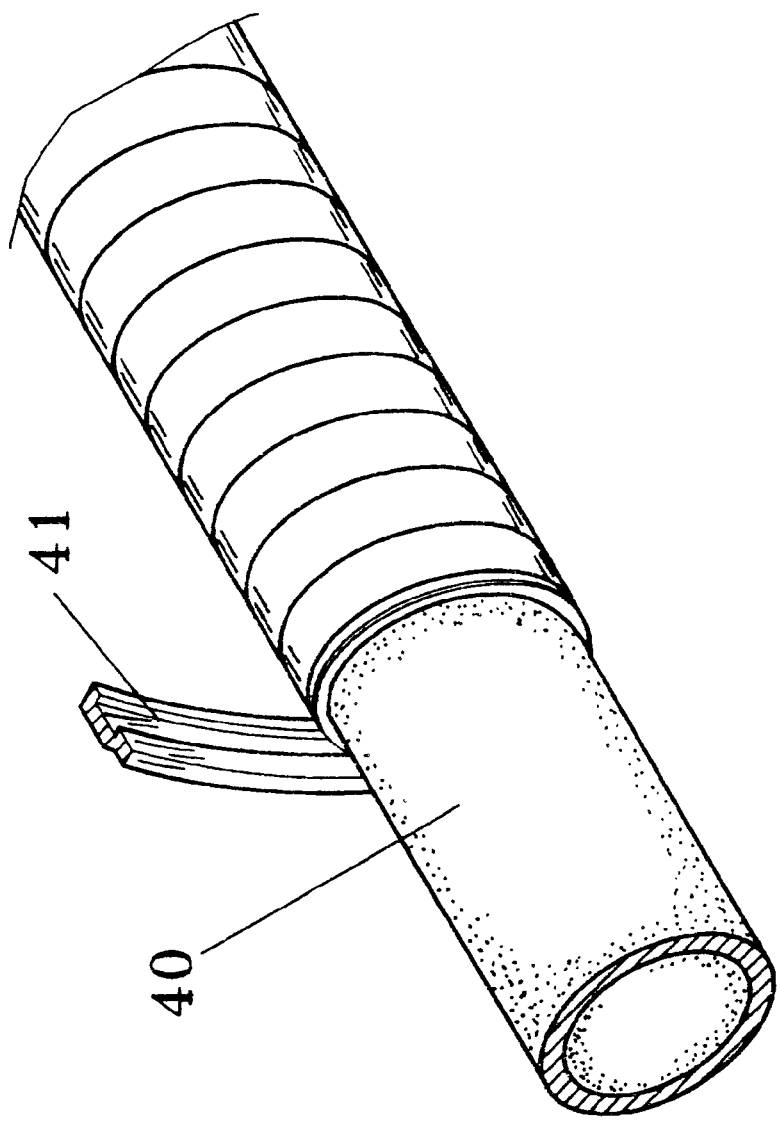
FIG. 7 is a perspective view of another prior art flexible tube.
Figure 8:
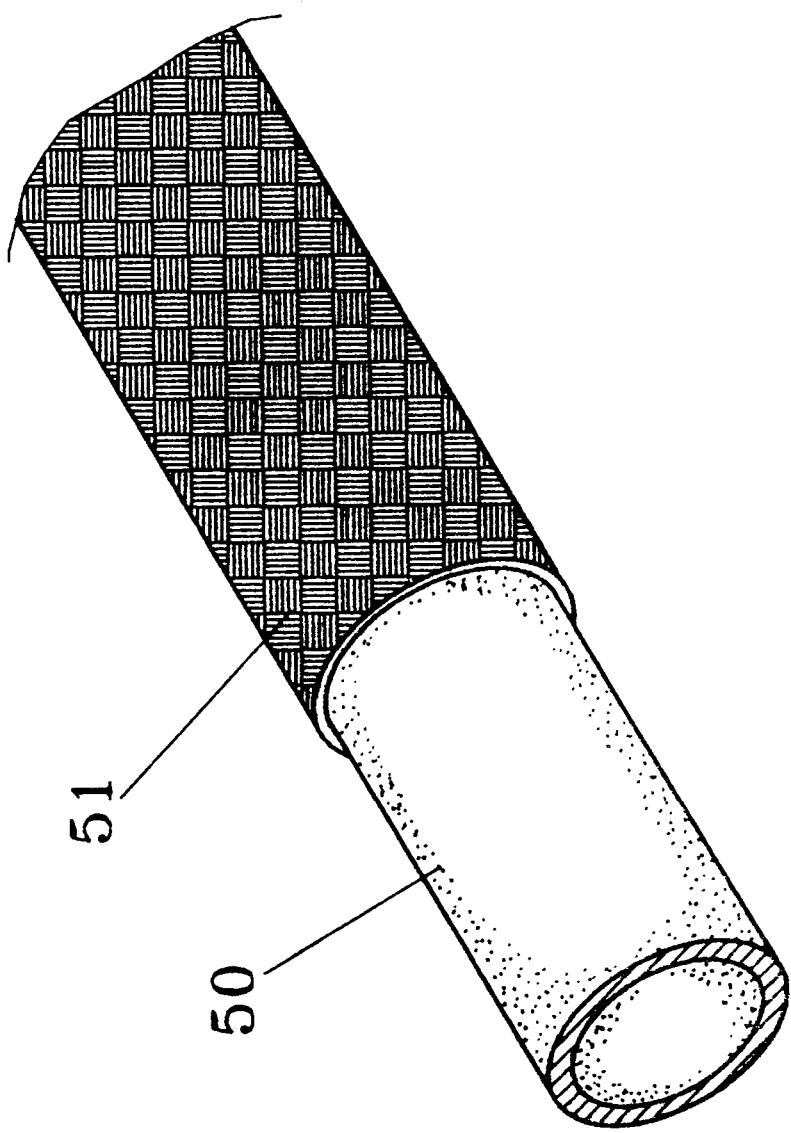
FIG. 8 is a perspective view of a further prior art flexible

Referring to FIGS. 1 to 4 and initially to FIG. 4, a flexible tube in accordance with the present invention generally includes an inner rubber tube 10 and an outer tube structure provided around the inner rubber tube 10. The outer tube structure includes an outer protective tube 20 defining a helical channel 21 therein. Referring to FIGS. 1 to 3, an elastomeric tubular member 22 (preferably made of polyvinyl chloride, PVC) extends through the helical channel 21. In addition, a rigid strip member 23 is received in and extends along a length of the tubular member 22. Further, a plurality of elastomeric strings 24 (e.g., nylon strings) are received in and extend along the length of the tubular member 22.

In assembly, the strings 24 and the strip member 23 are inserted into the tubular member 22 and then secured to the tubular member 22 by heat-seal. Next, the tubular member 22 with the strings 24 and strip member 23 therein is helically extended along the helical channel 21 of the outer protective tube 20 to form the outer tube structure which is subsequently, securely wound around the inner tube 10. It is appreciated that the tubular member 22 (with the strings 24 and strip member 23 therein) is secured to the outer protective tube 20 by heat-seal.

By such an arrangement, when the flexible tube constructed by the above procedure, the tubular member 22 may provide a bend-resistant structure as it contains the rigid strip member 23 and the elastomeric strings 24. As a result, when the flexible tube is subjected to a bending force or load, the inner tube 10 is prevented from being flattened to keep continuous delivery of fluid therein. Further, the tubular member 22 and the strings 24 are elastomeric and thus may return to its original shape after the load or bending force has been removed. Further, the rigid strip member 23 and the strings 24 are enclosed in the elastomeric tubular member 22 and thus cannot damage the inner tube 10 during bending or under load.

According to the above description, it is appreciated that the flexible tube in accordance with the present invention has increased resistance to deformation of the inner tube, better shape-recovery capability, and damage prevention to the inner tube.

Although the invention has been explained in relation to its preferred embodiment, it is to be understood that many other possible modifications and variations can be made without departing from the spirit and scope of the invention as hereinafter claimed.

What is claimed is:

1. A flexible tube, comprising an inner tube and an outer tube structure mounted around the inner tube, the outer tube structure comprising an outer protective tube wound around the inner tube and including a helical channel defined therein, an elastomeric tubular member securely mounted in and extended along the helical channel, a rigid strip member securely received in and extended along a length of the elastomeric tubular member, and a plurality of elastomeric strings received in and extended along the length of the elastomeric tubular member.

* * * * *